(12) United States Patent
Bourquin et al.

(10) Patent No.: US 8,288,913 B1
(45) Date of Patent: Oct. 16, 2012

(54) EXPOSED BAR INDUCTION MOTOR WITH PUNCHED-TO-SIZE AIR GAP

(75) Inventors: Thomas M. Bourquin, Peters, MO (US); Samuel E. Mayberry, Troy, MO (US); John H. Hussey, St. Louis, MO (US); Alan D. Crapo, Florissant, MO (US)

(73) Assignee: Nidec Motor Corporation, St. Louis, MO (US)

( * ) Notice: Subject to any disclaimer, the term of this patent is extended or adjusted under 35 U.S.C. 154(b) by 172 days.

(21) Appl. No.: 12/763,942

(22) Filed: Apr. 20, 2010

Related U.S. Application Data

(60) Provisional application No. 61/171,402, filed on Apr. 21, 2009.

(51) Int. Cl.
*H02K 1/06* (2006.01)
*H02K 15/02* (2006.01)

(52) U.S. Cl. ... 310/216.004; 310/216.016; 310/216.018; 29/596

(58) Field of Classification Search ........... 310/216.014, 310/216.016, 216.018; 29/596
See application file for complete search history.

(56) References Cited

U.S. PATENT DOCUMENTS

| | | | | |
|---|---|---|---|---|
| 3,175,277 A | * | 3/1965 | Brown et al. | 29/596 |
| 3,268,880 A | * | 8/1966 | Miller | 340/870.18 |
| 3,273,209 A | * | 9/1966 | Herzog et al. | 164/333 |
| 4,670,696 A | * | 6/1987 | Byrne et al. | 318/701 |
| 5,726,510 A | * | 3/1998 | Yoshimura et al. | 310/49.24 |
| 5,915,750 A | * | 6/1999 | Usher et al. | 29/596 |
| 6,118,197 A | * | 9/2000 | Bohlen | 310/89 |
| 2003/0057800 A1 | * | 3/2003 | Gizaw | 310/261 |
| 2005/0040727 A1 | * | 2/2005 | Edwards et al. | 310/217 |

\* cited by examiner

*Primary Examiner* — Quyen Leung
*Assistant Examiner* — Jose Gonzalez Quinones
(74) *Attorney, Agent, or Firm* — Hovey Williams LLP

(57) ABSTRACT

An electric induction motor assembly includes a rotor assembly and a stator assembly. The rotor assembly includes an exposed bar rotor comprising a plurality of axially stacked, punched-to-size rotor laminations. The stator assembly includes a plurality of axially stacked, punched-to-size stator laminations. Each of the laminations presents an axial thickness of less than 0.024 inches. The rotor assembly and the stator assembly cooperatively define a radially extending air gap between a radially outer periphery of the rotor assembly and a radially inner periphery of the stator assembly that is less that 0.012 inches.

20 Claims, 6 Drawing Sheets

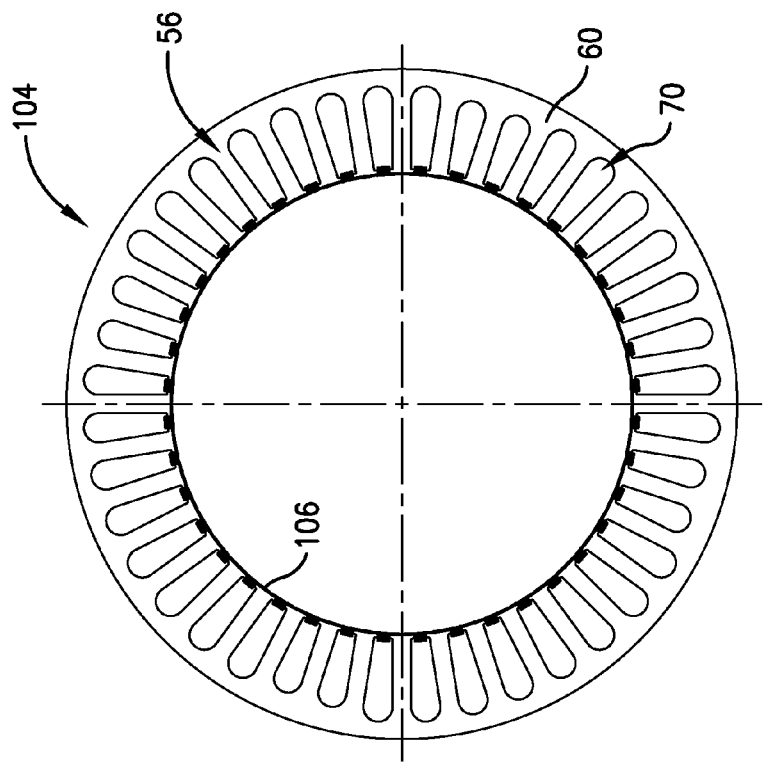
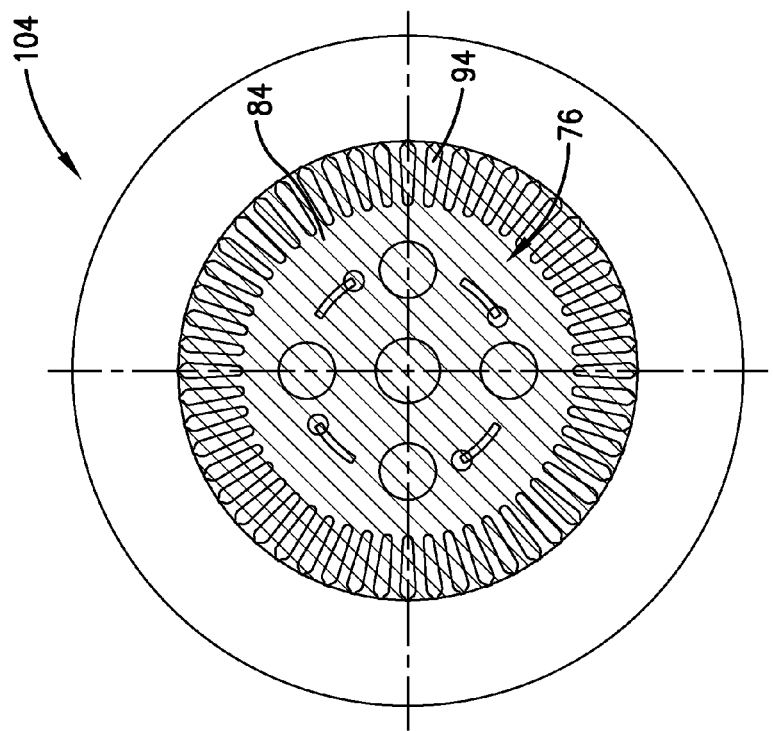

EXPOSED BAR INDUCTION MOTOR WITH PUNCHED-TO-SIZE AIR GAP

CROSS-REFERENCE TO RELATED APPLICATION

The present application claims the benefit of and priority from U.S. Provisional Patent Application Ser. No. 61/171,402, filed Apr. 21, 2009, the entire disclosure of which is hereby incorporated by reference herein.

BACKGROUND OF THE INVENTION

1. Field of the Invention

The present invention relates generally to an electric induction motor assembly. More specifically, the present invention concerns an electric induction motor assembly that includes an exposed bar rotor and a stator, with a punched-to-size air gap of less than 0.012 inches between the rotor and the stator.

2. Discussion of the Prior Art

Those of ordinary skill in the art will appreciate that electric induction motors typically include an air gap between the rotor and the stator, such that the rotor can freely rotate within the stator. Furthermore, electric induction motors with eight or ten poles tend to work best with rotor bars that are open or exposed to the air gap between the rotor and the stator (so-called "exposed bar" rotors). It is known that smaller air gaps generally lead to higher efficiencies, but manufacturing limitations have conventionally resulted in relatively large air gaps.

Traditionally, rotor and stator assemblies are made up of a plurality of steel laminations, which can be punched out of a lamination blank. In one example, rotor laminations have been punched out of the same material sheet as the stator laminations, with each rotor lamination being formed of material inboard of the stator lamination. In addition, the rotor lamination is punched to the desired outside dimensions of the rotor, such that no machining is required on the rotor. The minimum air gap that has been achieved with these "punched-to-size" exposed bar rotors has been 0.0125 inches.

One prior method of decreasing the size of the air gap has been to punch the rotor laminations with a larger-than-necessary diameter and a closed bar design, and then to machine the rotor diameter down to the desired size and expose the bars. Another prior method of improving efficiency has been to simply increase the size of the motor while maintaining the minimum achievable punched-to-size air gap of 0.0125 inches. Each of these options have included undesirable effects.

While machining down a larger-than-necessary rotor has been satisfactory in some respects, in that it can decrease the size of the air gap, those of ordinary skill in the art will also appreciate that machining rotors also introduces significant detrimental consequences. For example, machining the edges of the rotor laminations increases eddy current losses in the rotor by shorting out the laminations, unless there is additional treatment to remove the offending steel that is shorting to the next lamination. Such additional treatment undesirably adds process time and limits production volumes while adding cost to the manufacturing process. Alternatively, simply increasing the size of the motor can limit the use of the larger motor in many applications because of space limitations, and often a larger motor will still not match the higher efficiency provided by a smaller air gap.

SUMMARY

According to an aspect of the present invention, an electric induction motor assembly is uniquely configured to include an exposed bar rotor with a punched-to-size air gap that is less that 0.012 inches. The electric induction motor assembly includes a smaller air gap than was previously possible with a punched-to-size construction, thereby eliminating machining of the rotor, which could detrimentally affect performance. The smaller air gap provides an overall gain in efficiency of approximately fifteen percent over prior art motors. The smaller air gap with a punched-to-size rotor allows for improved efficiency without the limitations of using a larger motor or the longer manufacturing time and cost required for machining rotors.

According to one aspect of the present invention, an electric induction motor assembly is provided that includes a rotor assembly rotatable about an axis and a stator assembly spaced radially from the rotor assembly. The stator assembly comprises a plurality of axially stacked stator laminations, with each of the stator laminations presenting a punched-to-size radially inner periphery. The rotor assembly includes an exposed bar rotor assembly that comprises a plurality of axially stacked rotor laminations, with each of the rotor laminations presenting a punched-to-size radially outer periphery. Each of the stator laminations and rotor laminations presents an axial thickness of less than 0.024 inches. The stator assembly and the rotor assembly cooperatively define an air gap extending radially between the radially inner periphery of the stator assembly and the radially outer periphery of the rotor assembly that presents a radial dimension of less than 0.012 inches.

Another aspect of the present invention concerns a method of manufacturing components for an electric induction motor assembly. The method includes punching a plurality of radially extending rotor slots in a lamination blank, punching a rotor lamination out of the lamination blank to define a radially outer periphery of the rotor lamination, with the rotor slots being in communication with the radially outer periphery of the rotor lamination to form an exposed bar rotor lamination, punching a plurality of radially extending stator slots in the lamination blank, punching a stator lamination out of the lamination blank to define a radially outer periphery of the stator lamination, and punching an inner ring from the stator lamination to define a stator lamination radially inner periphery, with the ring defined between the radially outer periphery of the rotor lamination and the radially inner periphery of the stator lamination generally defining a gap of less than 0.012 inches therebetween.

This summary is provided to introduce a selection of concepts in a simplified form that are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

A preferred embodiment of the present invention is described in detail below with reference to the attached drawing figures, wherein:

FIG. 1 is an isometric, partial sectional view of an electric induction motor assembly constructed in accordance with the principles of a preferred embodiment of the present invention, illustrating a rotor assembly and a stator assembly disposed within a motor case that includes opposite endshields, and a shaft partially extending through one of the endshields, depicting in detail the stator assembly comprising a plurality of axially stacked stator laminations;

FIG. 7 is a schematic representation of the rotor lamination of FIG. 6 being punched out of a lamination blank to define the exposed bar design;

FIG. 8 is a schematic representation of the stator lamination of FIG. 5 having the internal diameter punched-to-size to define the air gap relative to the rotor lamination.

Figure 1:
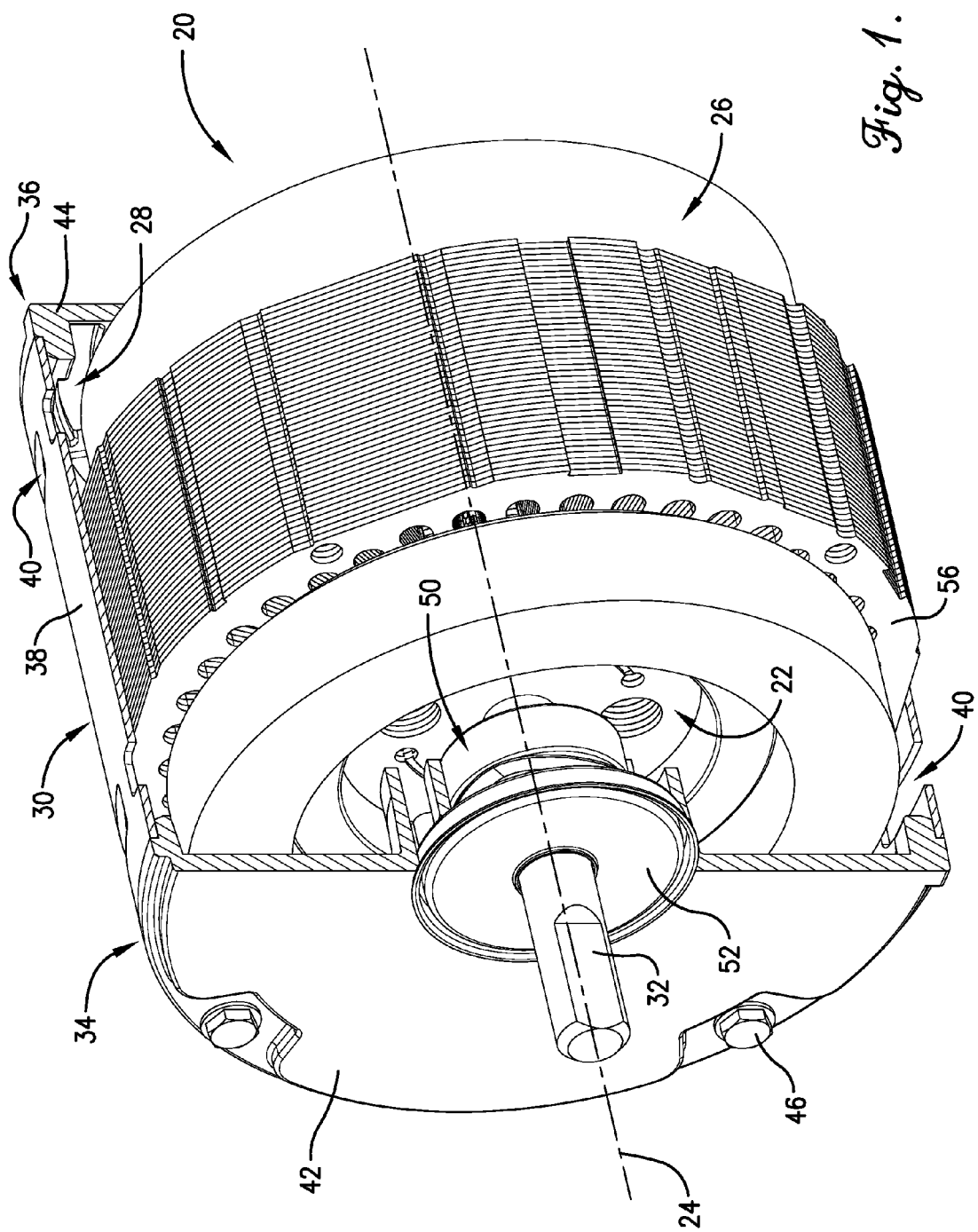

The drawing figures do not limit the present invention to the specific embodiments disclosed and described herein. The drawings are not necessarily to scale, emphasis instead being placed upon clearly illustrating the principles of the preferred embodiments.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

With initial reference to FIG. 1, an electric induction motor assembly 20 constructed in accordance with a preferred embodiment of the present invention is depicted for use in various applications. While the motor assembly 20 is useful in various applications, the illustrated embodiment has particular utility when the motor assembly 20 is configured as a low torque motor and/or when the motor assembly 20 is configured for use in condenser fan applications. As is customary, the motor assembly 20 broadly includes a rotor assembly 22, which is rotatable about an axis 24, and a stator assembly 26. The rotor assembly 22 and the stator assembly 26 are both contained within an internal motor chamber 28 that is defined by a motor case 30. The rotor assembly 22 includes an axially disposed shaft 32 that projects outwardly from one end of the motor case 30.

The motor case 30 is generally cylindrical and presents opposite axial margins 34, 36. The motor case 30 comprises a shell element 38 that includes a plurality of vent openings 40 disposed around a radially outer margin of the shell 38 to present a vented shell 38. It will be appreciated by one of ordinary skill in the art, however, that the alternative use of a non-vented shell (not shown) is clearly within the ambit of the present invention. The motor case 30 further comprises endshields 42, 44 disposed adjacent the axial side margins 34, 36, respectively, and secured to the shell 38. In the illustrated embodiment, each endshield 42, 44 is secured to the shell 38 with a plurality of fasteners comprising bolts 46. It will be readily appreciated by one of ordinary skill in the art, however, that either or both of the endshields 42, 44 could be alternatively secured to the shell 38, such as by welding or being integrally formed therewith, without departing from the teachings of the present invention.

Figure 2:
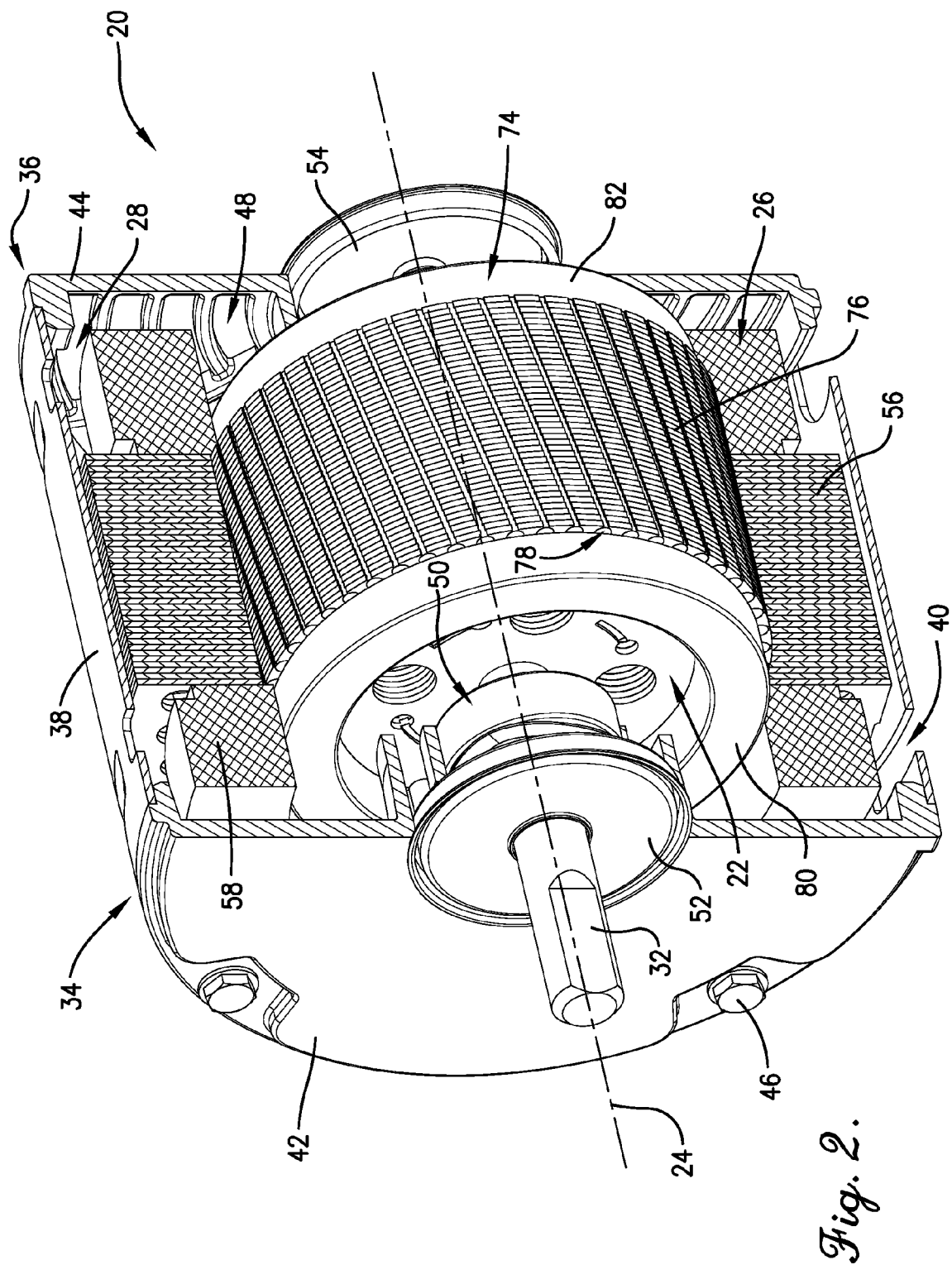
FIG. 2 is an isometric, partial sectional view of the induction motor assembly of FIG. 1, shown with the stator assembly in section, and depicting in detail the rotor assembly including an exposed bar rotor comprising a plurality of axially stacked rotor laminations.

Turning now to FIG. 2, it is noted that the endshields 42, 44 are substantially similar in many respects, with the notable exception that the endshield 42 is predominantly solid, while the endshield 44 includes a plurality of vent openings 48 defined therethrough. The vent openings 48 permit vent air to flow in a generally axial direction from outside to inside the motor chamber 28 to cool the motor assembly 20 from heat generated during operation. As will be readily appreciated by one of ordinary skill in the art upon review of this disclosure, a fan (not shown) configured for rotation with the rotor assembly 22 may be used to pull cooling vent air through the vent openings 48, into the chamber 28, and push the air out of the vent openings 40 in the shell 38 in order to provide a cooling effect to the motor assembly 20. In the illustrated embodiment, the vent openings 48 are defined by a grate pattern on the endshield 44. While only one embodiment is depicted here in detail, of course alternative cooling and/or venting arrangements, including a totally enclosed motor having a non-vented shell (not shown) and endshields without vent openings (such as the solid endshield 42), are contemplated and are clearly within the ambit of the present invention.

With continued reference to FIGS. 1 and 2, a bearing assembly 50 is operably associated with a portion of each endshield 42, 44 for rotatably supporting the shaft 32. Additionally, covers 52, 54 are operably secured to a portion of each endshield 42, 44 to substantially separate the internal motor chamber 28 from outside elements. As will be readily understood by one of ordinary skill in the art upon review of this disclosure, the covers 52, 54 are substantially similar in many respects, with the notable exception that the cover 52 includes a hole extending therethrough to surround and facilitate passthrough of the shaft 32, while the cover 54 is predominantly solid. As will be readily appreciated by one of ordinary skill in the art, various aspects of the depicted motor case 30, including the endshields 42, 44 and/or the covers 52, 54 may take alternative forms without departing from the teachings of the present invention.

Turning now to construction details of the stator assembly 26 (and with reference to FIGS. 1-5), the stator assembly 26 broadly includes a plurality of axially stacked stator laminations 56 and windings 58, with the windings 58 being depicted in conventional schematic form. As will be readily appreciated by one of ordinary skill in the art, the particular configuration of the windings 58 may directly impact the power, torque, voltage, operational speed, number of poles, etc. of the induction motor assembly 20. In the illustrated embodiment, the windings 58 are arranged such that the induction motor assembly 20 is configured as an eight-pole motor. Of course, alternative even numbers of poles, in particular a ten-pole motor, are contemplated and are clearly within the ambit of the present invention.

Figure 3:
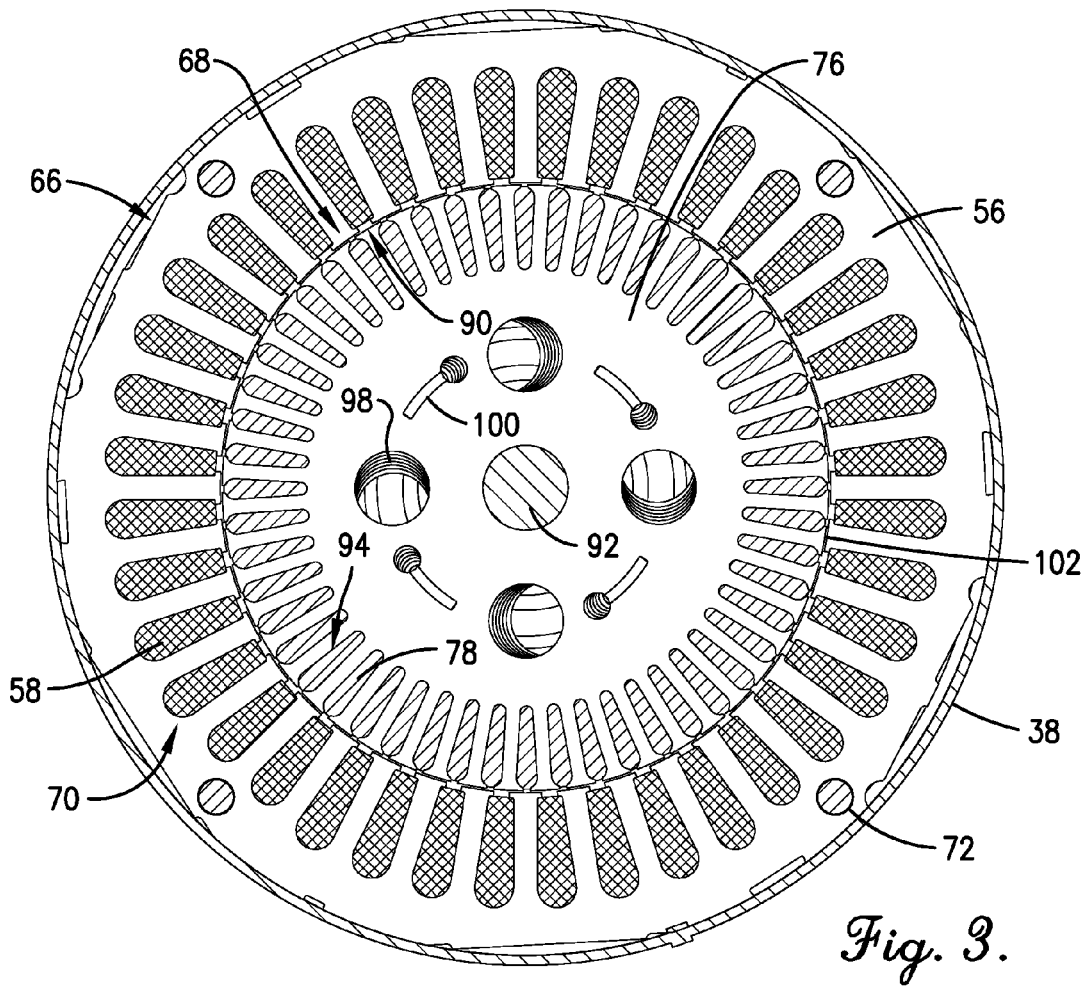
FIG. 3 is an axial sectional view of the induction motor assembly of FIG. 1, shown with the shaft removed, and depicting in detail the structural configuration of the stator laminations, the rotor laminations, and an air gap defined radially therebetween.
Figure 4:
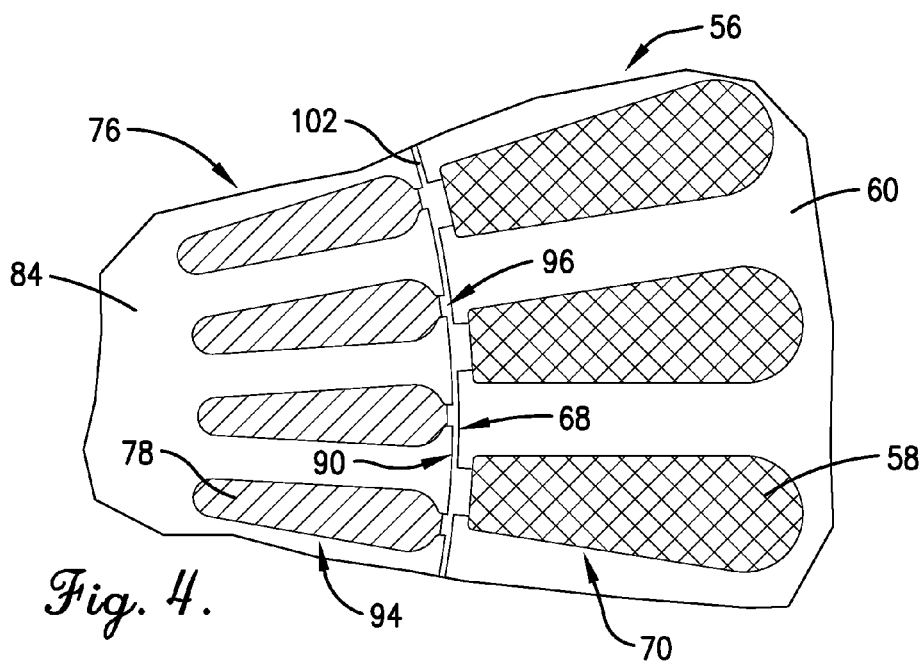
FIG. 4 is an enlarged, fragmentary, axial sectional view of a portion of the induction motor assembly as shown in FIG. 3, depicting in detail the punched-to-size air gap defined between the stator laminations and the rotor laminations.
Figure 5:
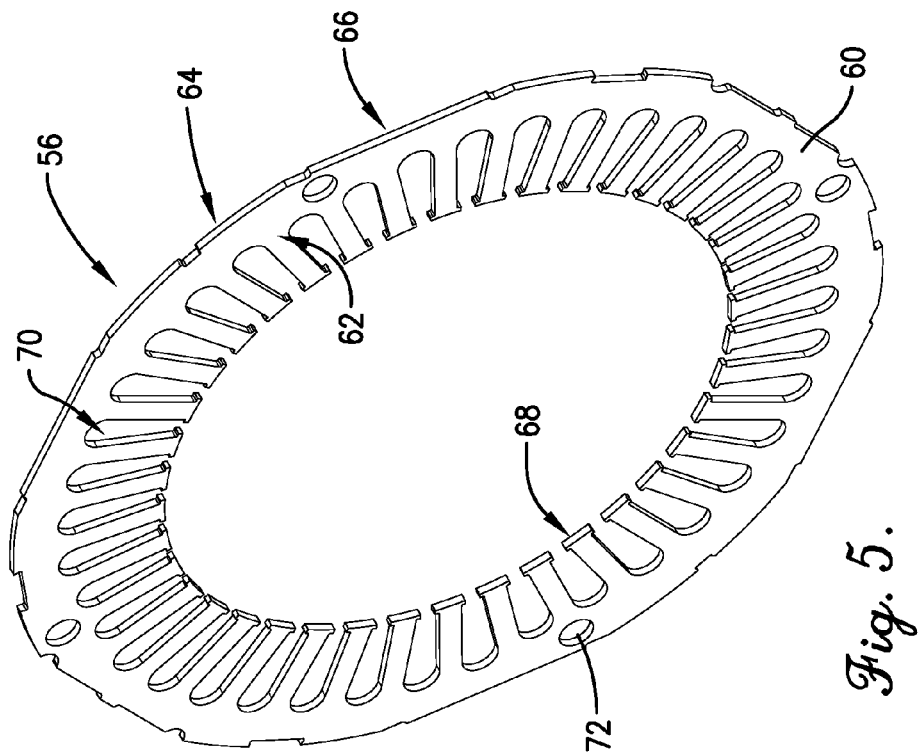
FIG. 5 is an isometric view of one of the stator laminations of the induction motor assembly of FIG. 1, depicting in detail the structural configuration of the lamination.

With particular attention to FIG. 5, each individual stator lamination 56 includes a substantially annular steel body 60, with the body 60 presenting first and second axially opposite sides 62, 64. Each stator lamination body 60 further presents a radially outer periphery 66 and a radially inner periphery 68. Each stator lamination body 60 includes a plurality of generally arcuate slots 70 extending axially therethrough, with each slot 70 being in communication with the radially inner periphery 68. As shown in FIGS. 2-4, the windings 58 pass through the slots 70 for receipt therein, as will be readily understood by one or ordinary skill in the art. It is noted that in the illustrated embodiment, each stator lamination body 60 includes forty slots 70, although various numbers of slots may be similarly provided without departing from the teachings of the present invention. Finally, each stator lamination body 60 includes a plurality of holes 72 extending axially therethrough, such that the bolts 46 pass through the holes 72 upon construction of the motor assembly 20, as depicted in FIGS. 1 and 2.

Each stator lamination body 60 presents an axial thickness, defined as the distance between the first side 62 and the opposite second side 64, of less than about 0.024 inches. More preferably, the axial thickness of the stator lamination body 60 is between about 0.019 and 0.023 inches. Generally speaking, the body 60 is identified in the industry as having a nominal thickness of 0.022 inches. Accordingly, with reference to FIGS. 1 and 2, the size of the stator assembly 26 is at least partially determined by the number of stacked stator laminations 56 used in the construction of the motor assembly 20. In the illustrated embodiment, the plurality of stacked stator laminations 56 is disposed in a loose lamination relationship with one another, although other relationships between the stacked stator laminations 56 (e.g., welded, pressed, glued, etc.) are within the ambit of the present invention.

Turning next to construction details of the rotor assembly 22 (and with reference to FIGS. 2-4 and 6), the rotor assembly 22 broadly includes an exposed bar rotor body 74 comprising a plurality of axially stacked rotor laminations 76 integrally formed (such as by die casting) with a plurality of aluminum bars 78 extending axially along the plurality of rotor laminations 76 and including aluminum rings 80, 82 disposed along each axial margin thereof. As will be readily appreciated by one of ordinary skill in the art, the particular configuration of the bars 78 may directly impact operation of the induction motor assembly 20. In the illustrated embodiment, the plurality of bars 78 skew slightly helically around the exposed bar rotor body 74 as the bars 78 extend axially along the plurality of rotor laminations 76. Of course, alternative configurations of bars, including but not limited to a more pronounced skew or no skew at all, are contemplated and are clearly within the ambit of the present invention.

Figure 6:
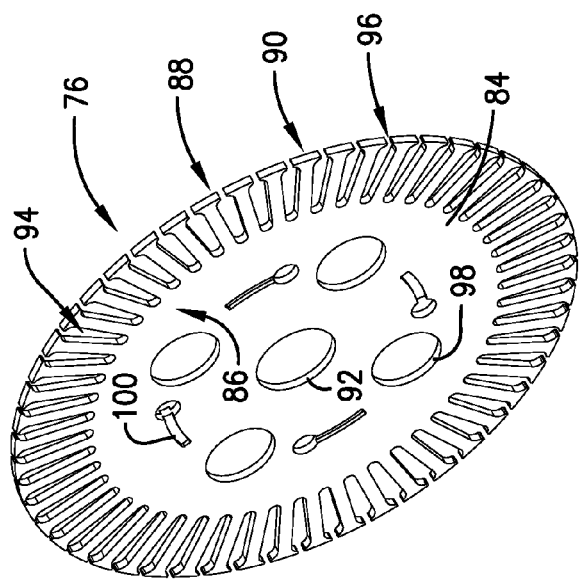
FIG. 6 is an isometric view of one of the rotor laminations of the induction motor assembly of FIG. 1, depicting in detail the structural configuration of the lamination, including the punched-to-size exposed bar design.

With particular attention to FIG. 6, each individual rotor lamination 76 includes a substantially annular steel body 84, with the body 84 presenting first and second axially opposite sides 86, 88. Each rotor lamination body 84 further presents a radially outer periphery 90 and an axially aligned shaft hole 92 extending axially therethrough to receive the shaft 32. Each rotor lamination body 84 includes a plurality of generally arcuate slots 94 extending axially therethrough, with each slot 94 being in communication with the radially outer periphery 90 at an opening 96. As shown in FIGS. 3 and 4, the aluminum bars 78 are formed to pass through the slots 94, with the aluminum bars 78 being exposed to the radially outer periphery 90 at the openings 96 to cooperatively form the exposed bar rotor body 74.

It is noted that in the illustrated embodiment, each rotor lamination body 84 includes fifty-two slots 94, although various numbers of slots may be similarly provided without departing from the teachings of the present invention. For example, as will be readily appreciated by one of ordinary skill in the art, variations in the configuration or the number of the slots 94, such as to present alternative arrangements of bars (including exposure and skew, discussed above), are contemplated and lie within the ambit of the present invention. Finally, each depicted rotor lamination body 84 includes a plurality of rotor venting holes 98 extending axially therethrough, such that venting air can pass through the exposed bar rotor body 74. It is noted, of course, that the rotor venting holes 98 may be altered in configuration, number, and/or shape (or omitted entirely), without departing from the teachings of the present invention.

Each rotor lamination body 84 presents an axial thickness, defined as the distance between the first side 86 and the opposite second side 88, of less than about 0.024 inches. More preferably, the axial thickness of the rotor lamination body 84 is between about 0.019 and 0.023 inches. Generally speaking, the body 84 is identified in the industry has having a nominal thickness of 0.022 inches. Accordingly, with reference to FIGS. 1 and 2, the size of the rotor assembly 22 is at least partially determined by the number of stacked rotor laminations 76 used in the construction of the motor assembly 20. In the illustrated embodiment, the plurality of stacked rotor laminations 76 is disposed in an interlocking relationship with one another, with each rotor lamination body 84 including a plurality of indentation tabs 100. As will be readily understood by one of ordinary skill in the art, the indentation tabs 100 of each rotor lamination body 84 are pressed into the adjacent rotor lamination body 84. It is noted, however, that other relationships between the stacked rotor laminations 76 (e.g., welded, pressed, glued, etc.) are within the ambit of the present invention.

With particular attention now to the enlarged view of FIG. 4, the radially inner periphery 68 of the stator assembly 26 and the radially outer periphery 90 of the exposed bar rotor body 74 cooperatively define an air gap 102 extending radially therebetween. The air gap 102 between the stator assembly 26 and the exposed bar rotor body 74 allows the rotor assembly 22 to rotate freely within the stator assembly 26. The air gap 102 presents a radial dimension of less than about 0.012 inches. More preferably, the air gap 102 presents a radial dimension that is between about 0.009 and 0.011 inches. Generally speaking, the air gap 102 is identified in the industry as having a nominal dimension of 0.010 inches.

With reference now to FIGS. 7 and 8, a method of manufacturing components for an electric induction motor assembly, such as the rotor laminations 76 and the stator laminations 56, is briefly described. As shown in FIG. 7, a lamination blank 104 is provided that includes material to be punched to form a rotor lamination 76 and to form a stator lamination 56. The rotor lamination 76 is punched-to-size from the lamination blank 104. In this way, with repetition of the punching process, a plurality of punched-to-size rotor laminations 76 may be formed and interlocked together, as described above, such that the exposed bar rotor body 74 is punched-to-size without requiring any machining of the exposed bar rotor body 74. Thus, common undesirable effects often caused by machining exposed bar rotors, such as increasing eddy current losses in the rotor by shorting out the laminations, are avoided by the present invention.

Next, as shown in FIG. 8, the stator lamination 56 is punched-to-size from the same lamination blank 104, including the removal of an inner ring of scrap 106 to define the radially inner periphery 68 of the stator lamination body 60. Most preferably, one of the rotor laminations 76 is punched from inside of one of the stator laminations 56, and the ring 106 is then removed from the inboard margin of the stator lamination 56, with the ring 106 substantially corresponding to and defining the air gap 102. The air gap 102 between the stator assembly, formed from a plurality of punched-to-size stator laminations 56, and the exposed bar rotor body 74, formed from a plurality of punched-to-size rotor laminations 76, is thereby punched-to-size without requiring any machining of the stator lamination 56.

The punched-to-size air gap 102 defines a gap between the stator assembly 26 and the exposed bar rotor body 74 that presents a radial dimension of less than about 0.012 inches. More preferably, the punched-to-size air gap 102 defines a gap between the stator assembly 26 and the exposed bar rotor body 74 that presents a radial dimension that is between about 0.009 and 0.011 inches. Generally speaking, the punched-to-size air gap 102 is identified in the industry as having a nominal dimension of 0.010 inches. It is noted that although an exemplary sequence of steps is described in association with the method of manufacturing described above, the manufacturing steps can be performed in any order, as will be readily appreciated by one of ordinary skill in the art upon review of this disclosure.

In the method of manufacturing described above, the rotor laminations 76 and the stator laminations 56 are punched-to-size from the same lamination blank 104, such that the rotor laminations 76 and the stator laminations 56 present the same axial thickness, although it is noted that such conformity is not necessarily required. It has been discovered that, in order to properly punch-to-size the inner ring of scrap 106 to define the radially inner periphery 68 of the stator lamination body 60 (and the corresponding air gap 102), the size of the scrap 106 to be punched may be approximately thirty-four percent of the thickness of the lamination blank 104. It is believed that the ratio of approximately thirty-four percent of the thickness of the lamination blank 104 represents a minimum size of the scrap 106 that may be accurately punched-to-size, such that an exemplary ratio may be greater than this threshold.

For example, the lamination blank 104 of one embodiment presents an axial thickness of less than about 0.024 inches. More preferably, the lamination blank 104 presents an axial thickness that is between about 0.019 and 0.023 inches. Generally speaking, the lamination blank 104 is identified in the industry has having a nominal thickness of 0.022 inches. Thus, the punched-to-size ring of scrap 106 (and the corresponding punched-to-size air gap 102) presents a radial dimension of less than about 0.012 inches, more preferably between about 0.009 and 0.011 inches, or generally known in the industry as a nominal dimension of 0.010 inches. As may be readily appreciated by one of ordinary skill in the art, in such an exemplary case, the ratio of the nominal dimension of the scrap 106 to the nominal thickness of the lamination blank 104 of the is approximately forty-five percent, which is greater than the minimum threshold as described above.

Turning briefly now to electric motor efficiency, it may be readily appreciated by one of ordinary skill in the art that an energy cost associated with the operation of an electric motor over the lifetime of the motor can amount to a significant financial burden for an end user. Thus, an improvement in overall motor efficiency, even if such an improvement is only a relatively small percentage, can result in significant savings in energy costs over the lifetime of the motor. An inventive improvement to motor design or construction resulting in an efficiency gain, therefore, may provide significant competitive advantage.

The electric induction motor assembly 20 of the present invention provides the punched-to-size air gap 102 that is smaller than an air gap previously achieved by prior art motors with punched-to-size rotors, leading to a higher efficiency than has been realized in the past. The smaller punched-to-size air gap 102 achieved by an embodiment of the present invention is formed by stator laminations 56 and by rotor laminations 76 that are both punched-to-size without any machining, as described in detail above, eliminating any additional manufacturing time and/or cost associated with machining rotors.

Figure 9:
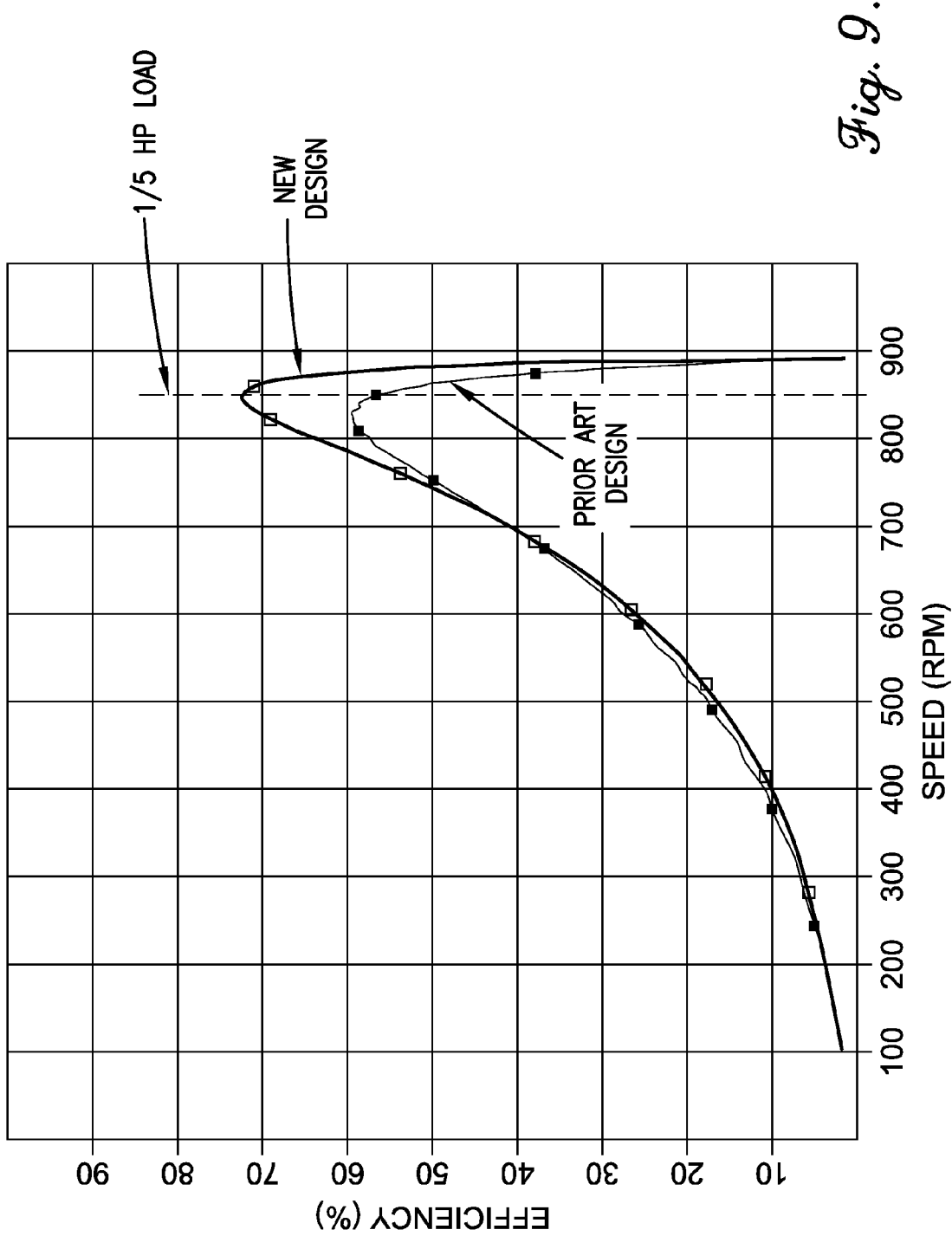
FIG. 9 is a chart including a scatter plot with trend lines depicting motor efficiency versus motor speed for the electric induction motor assembly of the present invention and for a prior art electric induction motor.

In particular, with specific reference now to FIG. 9, testing has shown that the electric induction motor assembly 20 constructed in accordance with a preferred embodiment of the present invention, as described in detail above, provides an overall gain in efficiency of approximately fifteen percent over prior art electric induction motor assemblies that include a punched-to-size air gap of at least 0.0125 inches. In more detail, a prior art motor and the electric induction motor assembly 20 constructed in accordance with a preferred embodiment of the present invention were both run at varying speeds, with motor efficiency being determined and plotted on the chart shown in FIG. 9. Both motors were run in an eight-pole configuration, at two-hundred-thirty volts, and at sixty hertz, such that the only difference between the motors was dimension of the punched-to-size air gap.

As will be readily understood by one of ordinary skill in the art upon a review of FIG. 9, at a load of one-fifth horsepower (corresponding to a motor speed of approximately eight-hundred-fifty revolutions per minute), the electric induction motor assembly 20 constructed in accordance with a preferred embodiment of the present invention, provides an overall gain in efficiency of approximately fifteen percent over the prior art electric induction motor assembly. This dramatic gain in efficiency is achieved without any additional manufacturing time and/or cost associated with machining rotors, providing a significant benefit in energy cost savings to an end user.

It is noted that the present description uses numerical ranges to quantify certain parameters relating to the invention. It is to be understood that when numerical ranges are provided, such ranges are to be construed as providing literal support for claim limitations that only recite the lower value of the range as well as claim limitations that only recite the upper value of the range. For example, a disclosed numerical range of between about 0.009 and 0.011 inches provides literal support for a claim reciting "greater than 0.009" (with no upper bounds) and a claim reciting "less than 0.011" (with no lower bounds). It is further noted that the numerical ranges of dimensions disclosed herein are rather critical within the relative scope of the ranges provides, as will be readily appreciated by one of ordinary skill in the art.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and access the reasonably fair scope of the present invention as pertains to any apparatus not materially departing from but outside the literal scope of the invention set forth in the following claims.

What is claimed is:

1. An electric induction motor assembly comprising:
a rotor assembly rotatable about an axis;

a stator assembly spaced radially from the rotor assembly;
said stator assembly comprising a plurality of axially stacked stator laminations,
each of said stator laminations presenting a punched-to-size radially inner periphery,
said rotor assembly including an exposed bar rotor assembly,
said exposed bar rotor assembly comprising a plurality of axially stacked rotor laminations,
each of said rotor laminations presenting a punched-to-size radially outer periphery,
each of said stator laminations and rotor laminations presenting an axial thickness of less than 0.024 inches,
said stator assembly and said rotor assembly cooperatively defining an air gap extending radially between the radially inner periphery of the stator assembly and the radially outer periphery of the rotor assembly,
said air gap presenting a radial dimension of less than 0.012 inches.

2. The electric induction motor assembly as claimed in claim 1,
each of said stator laminations and rotor laminations presenting an axial thickness within the range of between 0.019 and 0.023 inches.

3. The electric induction motor assembly as claimed in claim 2,
each of said stator laminations and rotor laminations presenting a nominal axial thickness of 0.022 inches.

4. The electric induction motor assembly as claimed in claim 1,
said air gap presenting a radial dimension within the range of between 0.009 and 0.011 inches.

5. The electric induction motor assembly as claimed in claim 4,
said air gap presenting a nominal radial dimension of 0.010 inches.

6. The electric induction motor assembly as claimed in claim 1,
said stator laminations and said rotor laminations being formed from a common lamination blank.

7. The electric induction motor assembly as claimed in claim 6,
said laminations comprising steel.

8. The electric induction motor assembly as claimed in claim 1,
said plurality of axially stacked rotor laminations being disposed in an interlocking relationship with one another.

9. The electric induction motor assembly as claimed in claim 8,
said plurality of axially stacked stator laminations being disposed in a loose lamination relationship with one another.

10. The electric induction motor assembly as claimed in claim 1,
said stator assembly being configured to define eight poles.

11. The electric induction motor assembly as claimed in claim 1,
said stator assembly being configured to define at least ten poles.

12. The electric induction motor assembly as claimed in claim 1,
said motor being configured as a low torque motor.

13. The electric induction motor assembly as claimed in claim 1,
said motor being configured for use in condenser fan applications.

14. A method of manufacturing components for an electric induction motor assembly, said method comprising the steps of:
(a) punching a plurality of radially extending rotor slots in a lamination blank;
(b) punching a rotor lamination out of the lamination blank to define a radially outer periphery of the rotor lamination,
said rotor slots being in communication with the radially outer periphery of the rotor lamination to form an exposed bar rotor lamination;
(c) punching a plurality of radially extending stator slots in the lamination blank;
(d) punching a stator lamination out of the lamination blank to define a radially outer periphery of the stator lamination; and
(e) punching an inner ring from the stator lamination to define a stator lamination radially inner periphery,
said ring defined between said radially outer periphery of the rotor lamination and said radially inner periphery of the stator lamination generally defining a gap of less than 0.012 inches therebetween.

15. The manufacturing method of claim 14,
said lamination blank presenting a thickness of less than 0.024 inches.

16. The manufacturing method of claim 15,
said lamination blank presenting a thickness within the range of between 0.019 and 0.023 inches.

17. The manufacturing method of claim 16,
said lamination blank presenting a nominal thickness of 0.022 inches.

18. The manufacturing method of claim 14,
said radially outer periphery of the rotor lamination and said radially inner periphery of the stator lamination cooperatively defining a gap within the range of between 0.009 and 0.011 inches therebetween.

19. The manufacturing method of claim 18,
said radially outer periphery of the rotor lamination and said radially inner periphery of the stator lamination cooperatively defining a nominal gap of 0.010 inches therebetween.

20. The manufacturing method of claim 14,
steps (a)-(e) being performed on a single progressive die.

* * * * *